(12) United States Patent
Alrutz (10) Patent No.: US 10,871,617 B2
(45) Date of Patent: Dec. 22, 2020

(54) HARDENED CONVERTER AND SEALING SHELL FOR FIELD TERMINATED CONNECTOR

(71) Applicant: COMMSCOPE, INC. OF NORTH CAROLINA, Hickory, NC (US)

(72) Inventor: Mark Emmett Alrutz, Hickory, NC (US)

(73) Assignee: COMMSCOPE, INC. OF NORTH CAROLINA, Hickory, NC (US)

( * ) Notice: Subject to any disclaimer, the term of this patent is extended or adjusted under 35 U.S.C. 154(b) by 0 days.

(21) Appl. No.: 16/489,175

(22) PCT Filed: Feb. 27, 2018

(86) PCT No.: PCT/US2018/019904
§ 371 (c)(1),
(2) Date: Aug. 27, 2019

(87) PCT Pub. No.: WO2018/157115
PCT Pub. Date: Aug. 30, 2018

(65) Prior Publication Data
US 2020/0064561 A1 Feb. 27, 2020

Related U.S. Application Data

(60) Provisional application No. 62/464,162, filed on Feb. 27, 2017.

(51) Int. Cl.
*G02B 6/38* (2006.01)
(52) U.S. Cl.
CPC ......... *G02B 6/3879* (2013.01); *G02B 6/3825* (2013.01); *G02B 6/3891* (2013.01)

(58) Field of Classification Search
CPC .......................... G02B 6/3879; G02B 6/3891
See application file for complete search history.

(56) References Cited

U.S. PATENT DOCUMENTS

| 5,317,663 A | 5/1994 | Beard et al. |
| 6,579,014 B2 | 6/2003 | Melton et al. |

(Continued)

FOREIGN PATENT DOCUMENTS

| EP | 2 302 431 A1 | 3/2011 |
| EP | 2 354 825 B1 | 7/2015 |

(Continued)

OTHER PUBLICATIONS

International Search Report and Written Opinion of the International Searching Authority for International Patent Application No. PCT/US2018/019904 dated Jun. 14, 2018, 12 pages.

*Primary Examiner* — Omar R Rojas
(74) *Attorney, Agent, or Firm* — Merchant & Gould P.C.

(57) ABSTRACT

A device for attaching a non-ruggedized fiber optic connector to a ruggedized fiber optic adapter port may include a converter, a sealing shell and a sealing element. The converter may include a first end including a first mechanical interface compatible with the ruggedized fiber optic adapter port, a second end including a second mechanical interface, and a channel for receiving the non-ruggedized fiber optic connector. The sealing shell may include a first end including a third mechanical interface compatible with the second mechanical interface of the converter and a second end supporting a cable seal for forming a seal with a cable extending from the non-ruggedized fiber optic connector. The sealing element may provide sealing between the first end of the sealing shell and the second end of the converter.

10 Claims, 8 Drawing Sheets

(56) References Cited

U.S. PATENT DOCUMENTS

| | | |
|---|---|---|
| 6,648,520 B2 | 11/2003 | McDonald et al. |
| 6,899,467 B2 | 5/2005 | McDonald et al. |
| 7,292,763 B2 | 11/2007 | Mertesdorf et al. |
| 7,537,393 B2 | 5/2009 | Anderson et al. |
| 7,614,797 B2 | 11/2009 | Lu et al. |
| 7,744,288 B2 | 1/2010 | Lu et al. |
| 7,677,814 B2 | 3/2010 | Lu et al. |
| 7,742,667 B2 | 6/2010 | Paschal et al. |
| 7,758,257 B2 | 7/2010 | Anderson et al. |
| 8,128,294 B2 | 3/2012 | Lu et al. |
| 8,130,002 B2 | 3/2012 | Tateishi et al. |
| 8,137,002 B2 | 3/2012 | Lu et al. |
| 8,718,427 B2 | 5/2014 | Paschal et al. |
| 8,992,098 B2 | 3/2015 | Anderson et al. |
| 9,229,174 B2 | 1/2016 | Anderson et al. |
| 9,482,829 B2 | 11/2016 | Lu et al. |
| 9,690,057 B2 | 6/2017 | Anderson et al. |
| 10,012,805 B2 | 7/2018 | Anderson et al. |
| 10,151,887 B2 | 12/2018 | de Jong et al. |
| 10,302,878 B2 | 5/2019 | Anderson et al. |
| 2005/0213921 A1 | 9/2005 | Mertesdorf et al. |
| 2006/0093303 A1 | 5/2006 | Reagan et al. |
| 2007/0036487 A1* | 2/2007 | Grzegorzewska ... G02B 6/3825 385/53 |
| 2008/0310796 A1 | 12/2008 | Lu |
| 2009/0003772 A1 | 1/2009 | Lu et al. |
| 2012/0087628 A1 | 4/2012 | Bran de Leon et al. |
| 2014/0133804 A1 | 5/2014 | Lu et al. |
| 2014/0273615 A1 | 9/2014 | Haberek et al. |
| 2014/0355936 A1* | 12/2014 | Bund ................... G02B 6/3802 385/81 |

FOREIGN PATENT DOCUMENTS

| | | |
|---|---|---|
| WO | 2006/135513 A1 | 12/2006 |
| WO | 2015/028433 A1 | 3/2015 |
| WO | 2015/197588 A1 | 12/2015 |
| WO | 2016/024014 A1 | 2/2016 |
| WO | 2016/156610 A1 | 10/2016 |

* cited by examiner

HARDENED CONVERTER AND SEALING SHELL FOR FIELD TERMINATED CONNECTOR

CROSS-REFERENCE TO RELATED APPLICATION

This application is a National Stage Application of PCT/US2018/019904, filed on Feb. 27, 2018, which claims the benefit of U.S. Patent Application Ser. No. 62/464,162, filed on Feb. 27, 2017, the disclosures of which is are incorporated herein by reference in their entireties. To the extent appropriate, a claim of priority is made to each of the above disclosed applications.

TECHNICAL FIELD

The present disclosure relates to fiber optic data transmission, and more particularly to fiber optic cable connection systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter includes an internal split sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter.

Certain fiber optic cable connection systems can be "ruggedized" or "hardened." The terms "ruggedized" or "hardened" apply to systems that are robust and suitable for use in an outside environment. An example of an existing ruggedized fiber optic connection system is described in U.S. Pat. Nos. 6,579,014, 6,648,520, and 6,899,467, which are hereby incorporated by reference in their entireties.

Figure 1:
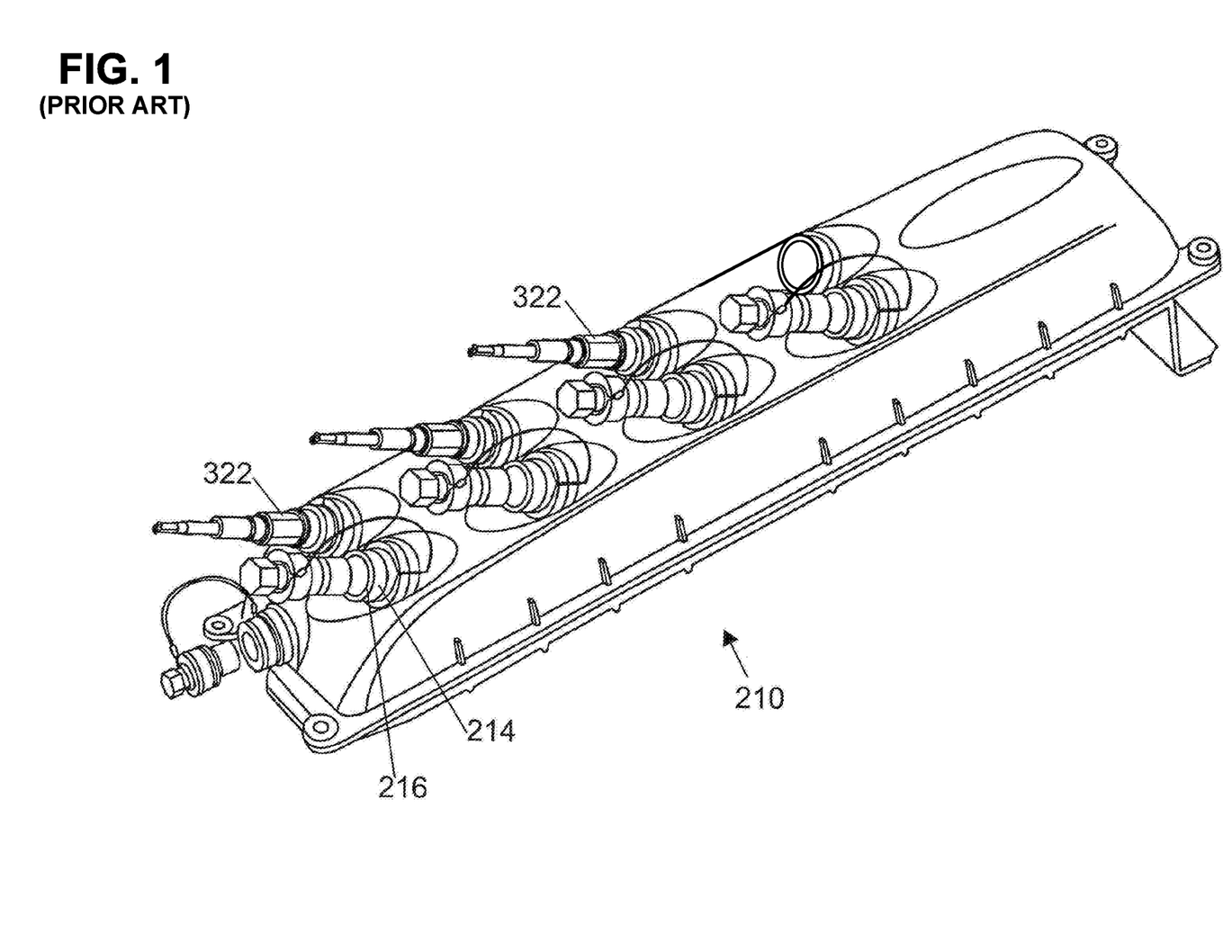
FIG. 1 is a perspective view of a prior art drop terminal having ruggedized fiber optic adapters.

Ruggedized fiber optic cable connection systems can include fiber optic adapters that are mounted to outside fiber optic enclosures such as drop terminals, network interface devices, splice enclosures or other housings/enclosures. FIG. 1 shows a fiber optic drop terminal 210, including a front face, to which multiple ruggedized fiber optic adapters 214 are mounted. The ruggedized fiber optic adapters 214 include inner ports configured to receive non-ruggedized fiber optic connectors and outer ports 216 configured to receive ruggedized fiber optic connectors 322. The inner ports are accessible from inside the drop terminal 210, and the outer ports 216 are accessible from outside the drop terminal 210. Further details regarding drop terminals and their applications in fiber optic networks are disclosed at U.S. patent application Publication Numbers US 2005/0213921, now U.S. Pat. No. 7,292,763, and US 2006/0093303, now U.S. Pat. No. 7,489,849, which are hereby incorporated by reference in their entireties.

Figure 2:
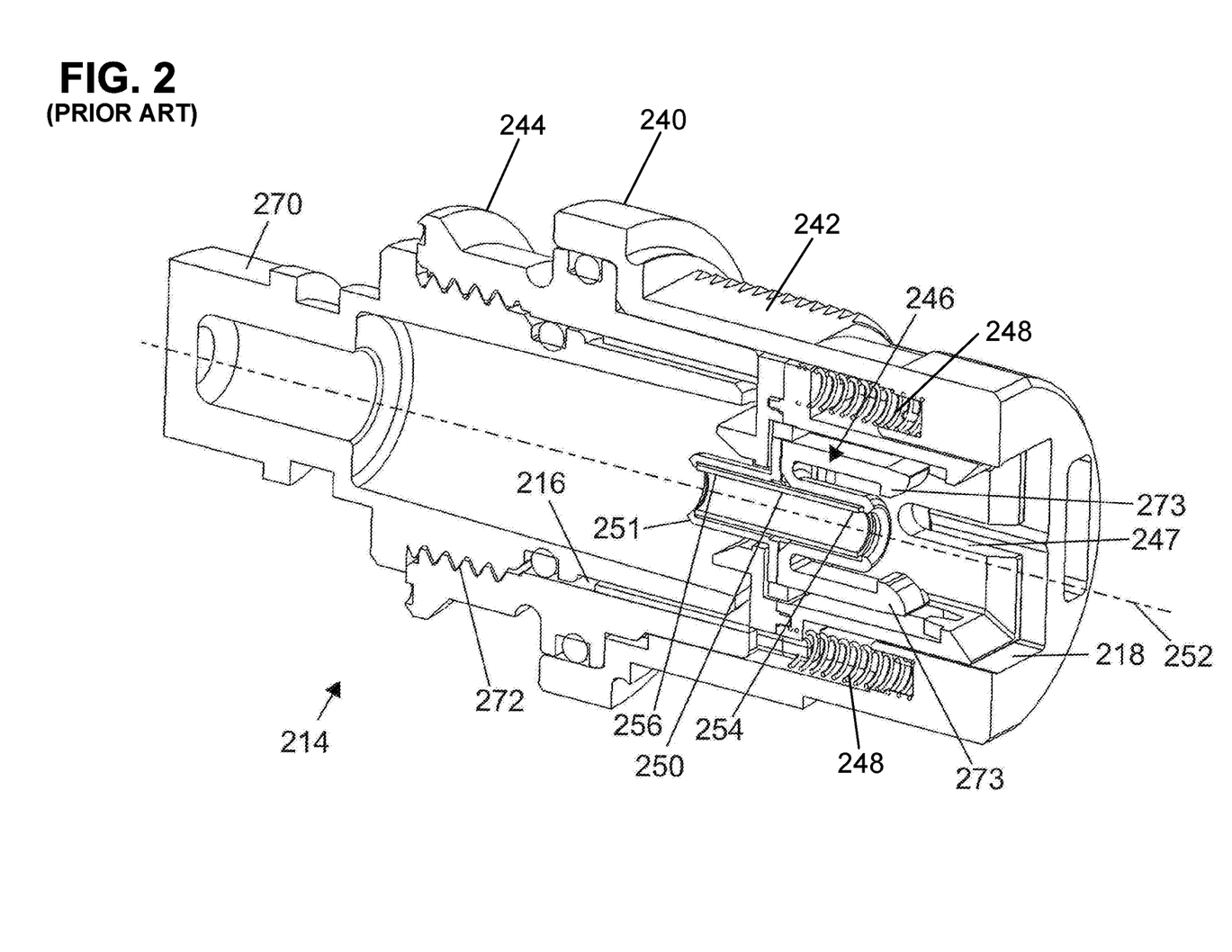
FIG. 2 perspective cut-away view cut lengthwise through a ruggedized fiber optic adapter of the type mounted on the drop terminal of FIG. 1.

FIG. 2 illustrates one of the fiber optic adapters 214 in isolation from the drop terminal 210. The fiber optic adapter 214 includes a ruggedized housing 240 having a first piece 242 that defines the inner port 218 of the fiber optic adapter 214 and a second piece 244 that defines the outer port 216 of the fiber optic adapter 214. The first and second pieces 242, 244 can be interconnected by a snap-fit connection to form the ruggedized housing 240. An interior adapter housing 246 mounts inside the ruggedized housing 240. Springs 248 bias the interior adapter housing 246 toward the outer port 216 and allow the interior adapter housing 246 to float within the interior of the ruggedized housing 240.

As shown at FIG. 2, the interior adapter housing 246 includes a cylindrical split sleeve holder 251 that houses a standard split sleeve 250. The split sleeve 250 is coaxially aligned with a center axis 252 of the fiber optic adapter 214. The split sleeve 250 includes an inner end 254 that faces toward the inner port 218 of the fiber optic adapter 214 and an outer end 256 that faces toward the outer port 216 of the fiber optic adapter 214. The fiber optic adapter 214 defines a plurality of internal threads 272 within the outer port 216 for use in securing a ruggedized fiber optic connector within the outer port 216. The fiber optic adapter 214 also includes resilient latches 273 for retaining a non-ruggedized fiber optic connector (e.g., a standard SC connector) within the inner port 218. The latches 273 are located adjacent the inner port 218. The interior adapter housing 246 also defines a keying slot 247 adjacent the inner port 218 for ensuring that the non-ruggedized fiber optic connector is inserted into the inner port 218 at the proper rotational orientation. Resilient latches are not provided at the outer port 216. A dust plug 270 is mounted within the outer port 216 of the fiber optic adapter 214 to prevent the adapter from being contaminated when no connector is inserted in the outer port 216. The dust plug 270 can be removed, to allow a connector to be inserted in the outer port 216. Other examples of ruggedized fiber optic adapters are described in the following patents and applications: WO 2016/156610; WO 2016/024014; U.S. Pat. No. 9,482,829 and WO 2015/197588, which are hereby incorporated by reference in their entireties.

Figure 3:
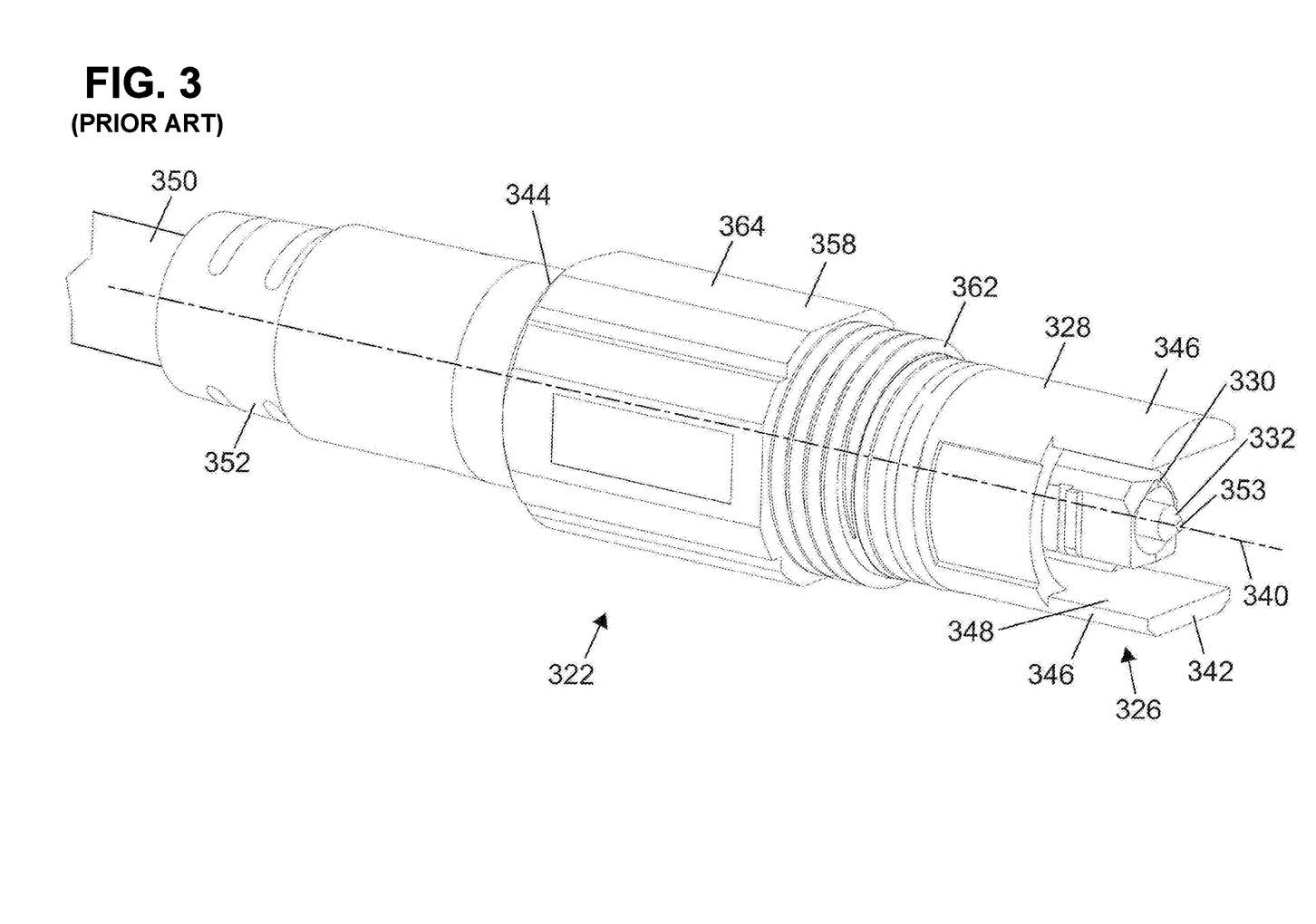
FIG. 3 is a perspective view of a ruggedized fiber optic connector adapted to be inserted in an outer port of the ruggedized fiber optic adapter of FIG. 2.

FIG. 3 illustrates one of the ruggedized fiber optic connectors 322 adapted to be inserted in the outer port 216 of the fiber optic adapter 214. The fiber optic connector 322 includes an outer housing 328 and a connector body 330. The connector body 330 supports a ferrule 332 located at a connector interface end 326 of the fiber optic connector 322. The outer housing 328 of the fiber optic connector 322 is elongated along a central axis 340 and includes a first end 342 positioned opposite from a second end 344. The first end 342 of the outer housing 328 is positioned at the connector interface end 326 of the fiber optic connector 322 and includes a pair of opposing extensions or paddles 346 positioned on opposite sides of the connector interface housing 330. The paddles 346 are generally parallel to the central axis 340 and are separated from one another by a gap 348 in which the connector body 330 is located. The paddles 346 have different shapes and mate with corresponding regions of the outer port 216 to provide a keying function for ensuring that the fiber optic connector 322 is mounted at the proper rotational orientation within the outer port 216. The second end 344 of the outer housing 328 is adapted to receive a fiber optic cable 350 having a fiber 353 that terminates at the ferrule 332. A resilient boot 352 can be positioned over the second end 344 of the outer housing 328 to provide bend radius protection at the interface between the outer housing 328 and the fiber optic cable 350.

Referring still to FIG. 3, the fiber optic connector 322 also includes a retention nut 358 rotatably mounted about the exterior of the outer housing 328. The retention nut 358 is free to be manually turned relative to the outer housing 328 about the central axis 340. The retention nut 358 includes an externally threaded portion 362 and a gripping portion 364. The gripping portion 364 includes a plurality of flats that allow the gripping portion 364 to be easily grasped to facilitate manually turning the retention nut 358 about the central axis 340. To secure the fiber optic connector 322 within the outer port 216 of the fiber optic adapter 214, the threaded portion 362 is threaded into the inner threads 272. When the fiber optic connector 322 is secured within the outer port, the ferrule 332 fits within the outer end 256 of the split sleeve 250 of the fiber optic adapter 214.

Figure 4:
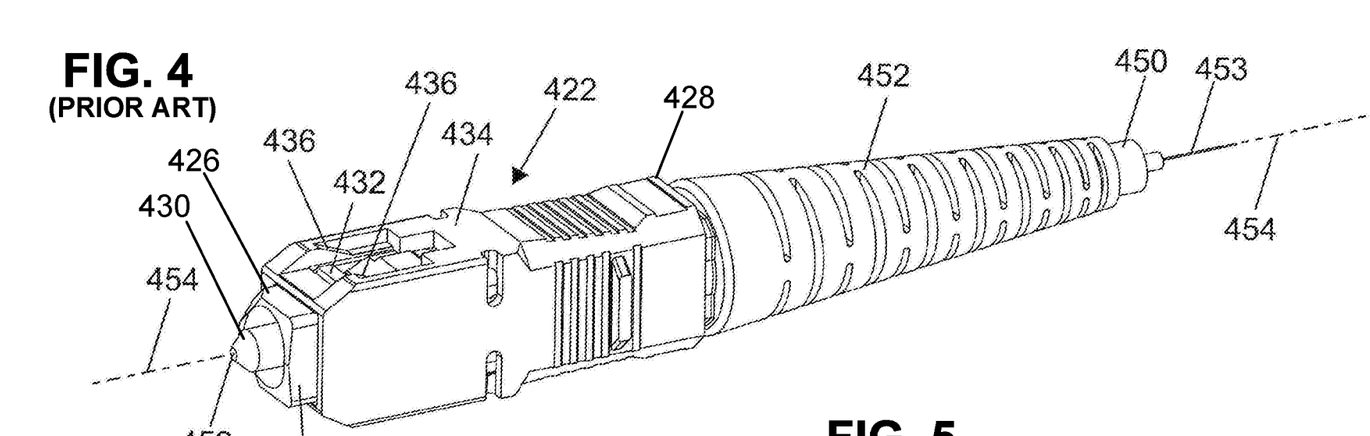
FIG. 4 is a front, top perspective view of a standard non-ruggedized SC fiber optic connector adapted to be inserted in an inner port of the fiber optic adapter of FIG. 2.
Figure 5:
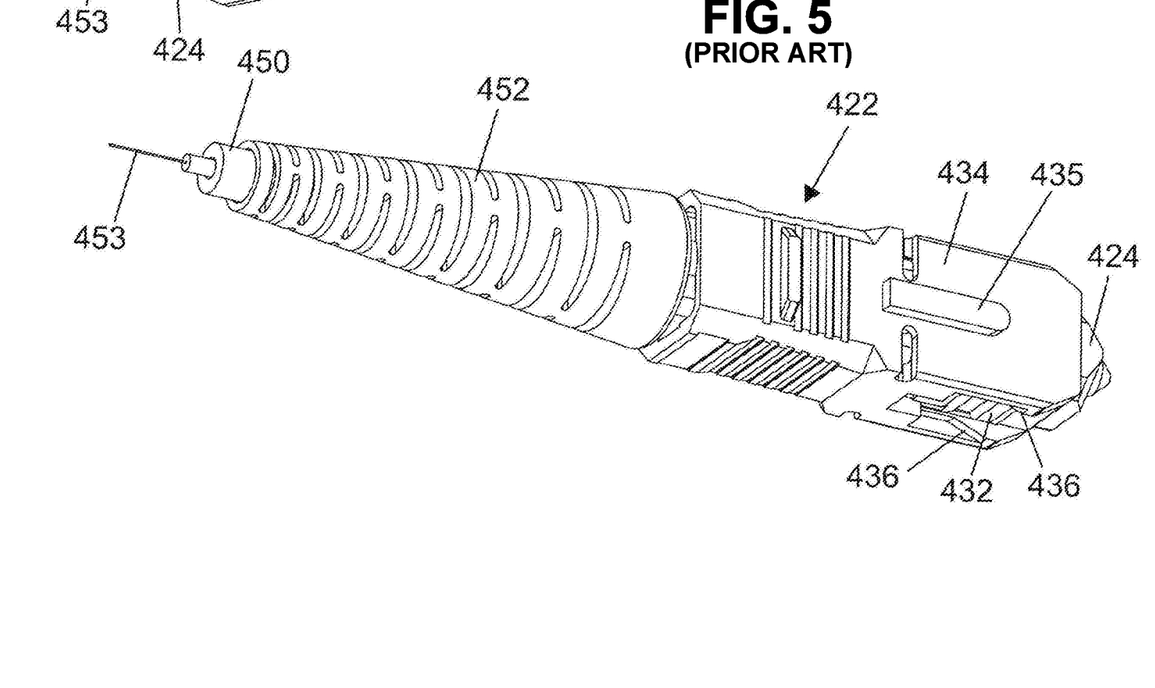
FIG. 5 is a rear, bottom perspective view of the standard non-ruggedized SC fiber optic connector of FIG. 4.

FIGS. 4 and 5 show a standard non-ruggedized SC fiber optic connector 422 adapted to be inserted in the inner port 218 of the fiber optic adapter 214. The connector 422 includes a connector body 424 in which a ferrule assembly is mounted. The connector body 424 includes a first end 426 positioned opposite from a second end 428. The first end 426 provides a connector interface at which a ferrule 430 of the ferrule assembly is supported. Adjacent the first end 426, the connector body 424 includes retention shoulders 432 that are engaged by the resilient latches 273 of the adapter 214 when the connector 422 is inserted in the inner port 218. The latches 273 function to retain the connector 422 within the inner port 218. The second end 428 of the connector body 424 is adapted to receive a fiber optic cable 450 having a fiber 453 that terminates in the ferrule 430. A resilient boot 452 can be positioned at the second end 428 of the connector body 424 to provide bend radius protection at the interface between the connector body 424 and the fiber optic cable 450.

The connector 422 also includes a retractable release sleeve 434 that mounts over the connector body 424. The release sleeve 434 can be slid back and forth relative to the connector body 424 through a limited range of movement that extends in a direction along a longitudinal axis 454 of the connector 422. The release sleeve 434 includes release ramps 436 that are used to disengage the latches 273 from the retention shoulders 432 when it is desired to remove the connector 422 from the inner port 218. For example, by pulling back (i.e., in a direction toward the second end 428 of the connector body 424) on the retention sleeve 434 while the connector 422 is mounted in the inner port 218, the release ramps 436 force the latches 273 apart from one another a sufficient distance to disengage the latches 273 from the retention shoulders 432 so that the connector 422 can be removed from the inner port 218. The release sleeve 434 includes a keying rail 435 that fits within the keying slot 247 of the interior adapter housing 246 to ensure proper rotational alignment of the connector 422 within the inner port 218. When the connector 422 is latched within the inner port 218, the ferrule 430 fits within the inner end 254 of the split sleeve 250 of the fiber optic adapter 214. Further details regarding SC-type fiber optic connectors are disclosed at U.S. Pat. No. 5,317,663, which is hereby incorporated by reference in its entirety.

For some applications, there exists a desire to insert non-ruggedized connectors into ruggedized adapter ports. A prior art technique for accommodating this need involves using a converter to make the non-ruggedized connector compatible with a ruggedized adapter port (e.g., see U.S. Pat. No. 7,677,814, which is hereby incorporated fully by reference). However, this solution does not provide environmental sealing.

SUMMARY

One aspect of the present disclosure relates to a device for attaching a non-ruggedized fiber optic connector to a ruggedized fiber optic adapter port. The device may include a converter, a sealing shell and a sealing element. The converter may have a first end, a second end and a channel between the two. The first end may include a first mechanical interface compatible with the ruggedized fiber optic adapter port, the first mechanical interface including a first seal that provides sealing with the ruggedized fiber optic adapter port when the first end of the converter is positioned within the ruggedized fiber optic adapter port, the first mechanical interface also including a first fastening interface that interlocks with the ruggedized fiber optic adapter port to secure the converter within the ruggedized fiber optic adapter port. The second end may include a second mechanical interface, which includes a second fastening interface. The channel extends through the converter between the first and second ends for receiving the non-ruggedized fiber optic connector.

The sealing shell may include a first end and a second end. The first end may include a third mechanical interface compatible with the second mechanical interface of the converter, the third mechanical interface including a third fastening interface that interlocks with the second fastening interface to secure the first end of the sealing shell to the second end of the converter. The second end may support a cable seal for forming a seal with a cable extending from the non-ruggedized fiber optic connector. Finally, the sealing element may provide sealing between the first end of the sealing shell and the second end of the converter.

In some embodiments, the sealing element may be mounted at the second end of the converter. In some embodiments, the sealing element may be either an axial face seal or a radial seal. In some embodiments, the sealing element may be an elastomeric ring. The cable seal may be an elastomeric sealing grommet, for example. In some embodiments, the first fastening interface includes a rotational interlock. For example, the rotational interlock may include threads or a bayonet interface. In some embodiments, the second and third fastening interfaces include rotational interlocks. Again, the rotational interlocks may include threads or bayonet interfaces.

A variety of additional inventive aspects will be set forth in the description that follows. The inventive aspects can relate to individual features and to combinations of features.

Both the forgoing general description and the following detailed description are exemplary and explanatory only and are not restrictive of the broad inventive concepts upon which the embodiments disclosed herein are based.

DETAILED DESCRIPTION

The system depicted herein is adapted to provide mechanical compatibility and sealing between a non-ruggedized SC-connector and a ruggedized fiber optic adapter, suitable for use with fiber optic connector housing SC-type form factors (e.g., an Optitap™ style adapter, sold by Corning Cable Systems of Hickory, N.C.). Systems for providing mechanical compatibility and sealing between other types of non-ruggedized connectors and other types of ruggedized fiber optic adapters (e.g., DLX™ fiber optic adapters, as disclosed in U.S. Pat. No. 9,482,829) are also within the scope of the present disclosure.

One aspect of the present disclosure relates to a system for providing mechanical compatibility and sealing between a non-ruggedized fiber optic connector (e.g., an SC-type connector, an LC-type connector, an ST-type connector or an FT-type connector) and a ruggedized fiber optic adapter port. The system can include a converter and a sealing sleeve. The converter can receive the non-ruggedized fiber optic connector and can include first and second interface portions. The first interface portion provides mechanical compatibility, securement and sealing, with respect to the ruggedized fiber optic adapter port. The second interface portion provides mechanical compatibility, securement and sealing, with respect to the sealing sleeve. The sealing sleeve is configured to provide sealing about a cable corresponding to the non-ruggedized fiber optic connector.

Figure 6A:
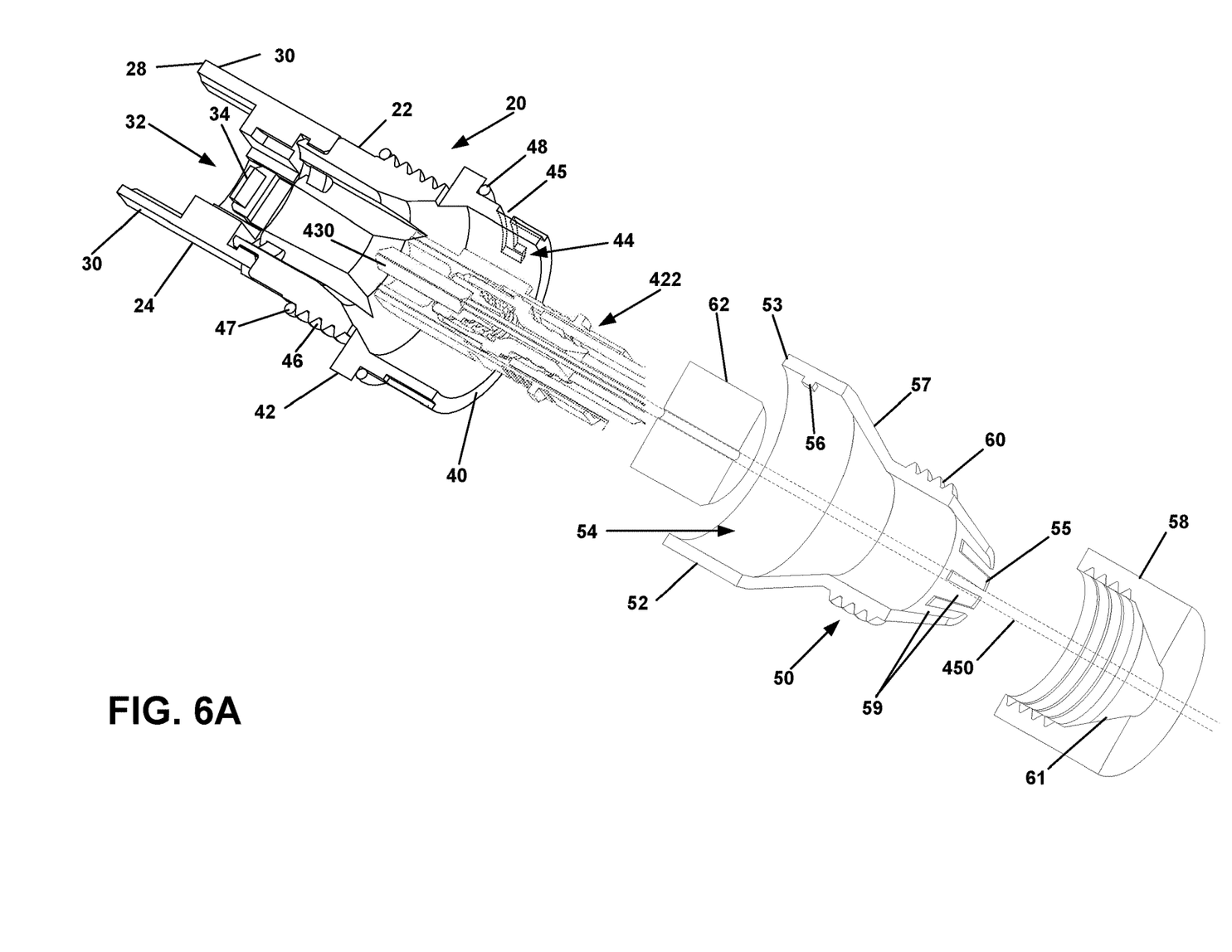
FIGS. 6A and 6B are cross-sectional perspective views of a hardened converter and sealing shell, with a standard non-ruggedized SC fiber optic connector, according to one embodiment.
Figure 6B:
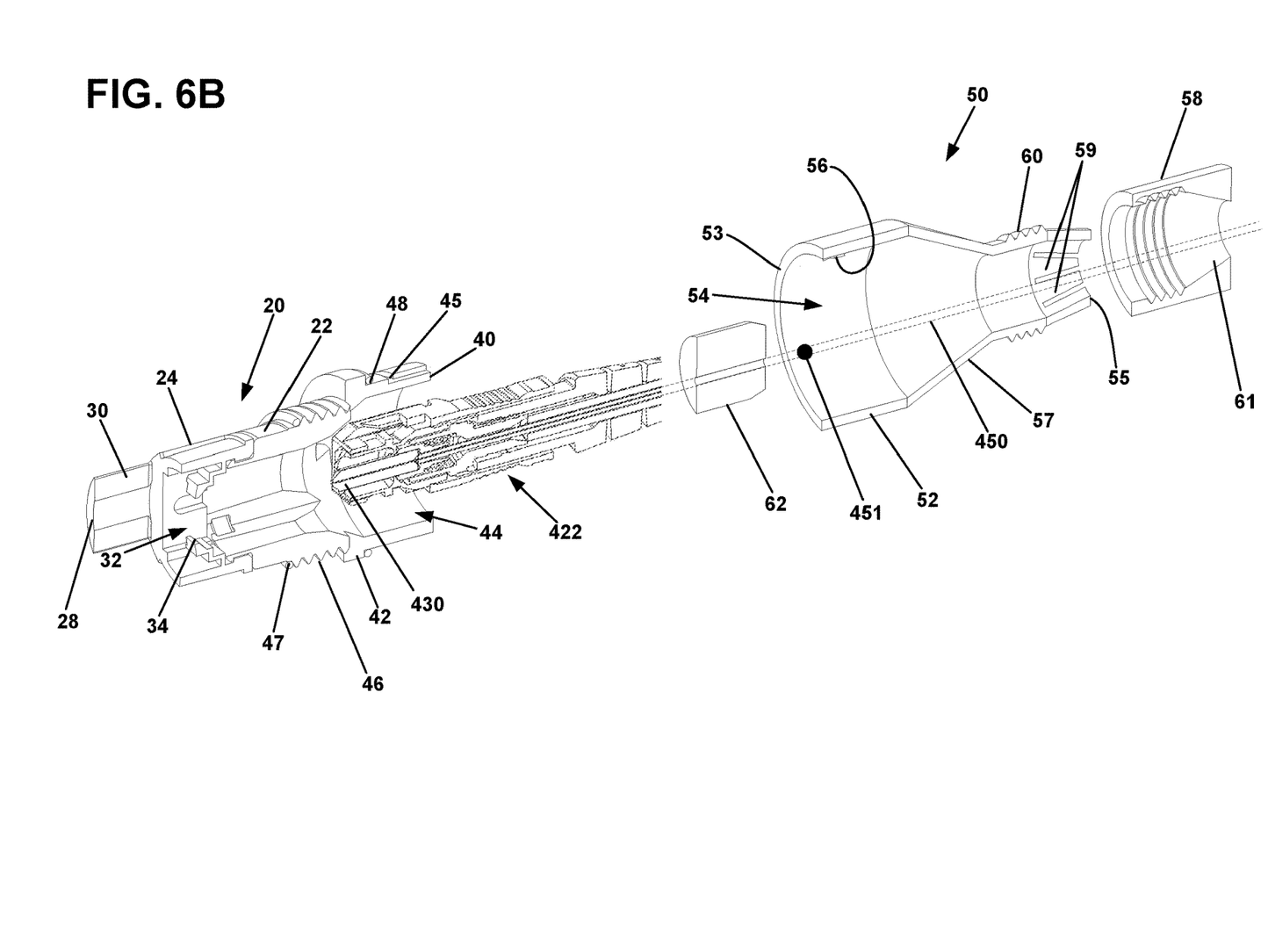

FIGS. 6A and 6B show a hardened converter 20 and a sealing shell 50 having features that are examples of inventive aspects in accordance with the principles of the present disclosure. The hardened converter 20 and sealing shell 50 are adapted to provide mechanical compatibility and sealing between a non-ruggedized SC-connector (e.g., the fiber optic connector 422 of FIGS. 4 and 5) and a ruggedized fiber optic adapter (e.g., the fiber optic adapter 214 of FIGS. 1 and 2). The hardened converter 20 mounts within the ruggedized outer port 216 and provides a mechanical interface suitable for receiving and retaining the fiber optic connector 422 within the outer port 216. The hardened converter 20 also functions to align the fiber optic connector 422 within the outer port 216, such that the ferrule 430 fits within the outer end 256 of the split sleeve 250 of the fiber optic adapter 214. In addition, the hardened converter 20 may rotationally orient the fiber optic connector 422 within the outer port 216 (e.g., opposing paddles 30 of the hardened converter 20 may fit within corresponding receivers defined within the outer port 216, to provide a keying function).

With continued reference to FIGS. 6A and 6B, the hardened converter 20 includes an anchoring piece 22 connected to a connector holder 24 (e.g., by a snap fit connection). The anchoring piece 22 and the connector holder 24 are both aligned along a central longitudinal axis of the hardened converter 20. The anchoring piece 22 can be manually rotated relative to the connector holder 24 about the central longitudinal axis.

The connector holder 24 forms a first end 28 of the interface converter and is shaped with a mechanical interface that complements or is compatible with the inner shape defined within the ruggedized outer port 216 of the fiber optic adapter 214. For example, the connector holder 24 includes the opposing paddles 30 that fit within the corresponding receivers defined within the outer port 216 to ensure proper rotational alignment between the connector holder 24 and the outer port 216. The connector holder 24 is configured to receive and retain the fiber optic connector 422. For example, the connector holder 24 defines a central passage 32 shaped and sized to accommodate the outer shape of the release sleeve 434 of the fiber optic connector 422. In this way, the connector 422 can be received within the central passage 32. The connector holder 24 also includes structure for mechanically retaining the fiber optic connector 422 within the central passage 32. For example, the connector holder 24 may include opposing flexible latches 34 configured to interlock with the retention shoulders 432 of the fiber optic connector 422 when the fiber optic connector 422 is inserted in the central passage 32. The interlock between the latches 34 and the retention shoulders 432 functions to retain the fiber optic connector 422 within the central passage 32. The latches 34 can be disengaged from the retention shoulders 432 by pulling back on the release sleeve 434, thereby causing the ramped surfaces 436 (see FIG. 4) of the release sleeve 434 to force the latches 34 apart a sufficient distance to disengage the latches 34 from the retention shoulders 432. Other examples of converters may be adapted for receiving the SC connector body with the release sleeve removed.

The anchoring piece 22 forms a second end 40 of the hardened converter 20. The second end 40 is positioned opposite from the first end 28. The anchoring piece 22 defines a central passage 44 that aligns with the central passage 32 of the connector holder 24. In one embodiment, the central passage 44 is tapered at the second end 40 to provide a transition or lead-in for facilitating inserting the fiber optic connector 422 into the central passage 44. The anchoring piece 22 also includes external threads 46, sized to match or inter-mate with the internal threads 272 provided within the outer port 216 of the fiber optic adaptor 214. The anchoring piece 22 also includes a first sealing ring 47 for forming a seal with the outer port 216 of the fiber optic adaptor 214 and a second sealing ring 48 for forming a seal with an inner surface of the sealing shell 50. Finally, the anchoring piece 22 also includes a flange 42 and at least one bayonet recess 45. By threading the anchoring piece 22 within the internal threads 272, the hardened converter 20 can be anchored within, and can form a seal with, the outer port 216 of the fiber optic adapter 214.

The sealing shell 50 may include a shell body 52, which forms an inner passage 54 and includes a bayonet protrusion 56 on its inner surface. The shell body 52 has a first end 53 with a diameter sized to fit over the second end 40 of the hardened converter 20, a second end 55 with a narrower diameter, and a tapered portion 57 between the two ends 53, 55. Near the second end 55, the outer surface of the shell body 52 includes threads 60 for mating with complementary threads on a nut 58. A sealing material 62 is positioned inside the shell body 52 near the second end 55, so that when the nut 58 is fastened to the threads 60 of the shell body 52, the sealing material 62 is radially compressed to form a seal around the fiber optic cable 450. In some embodiments, the fiber optic cable 450 may include a splice 451. Fingers 59 near the second end 55 of the shell 50 may engage a tapered portion 61 of the nut 58, such that the fingers 59 act as a nested cone, causing radial compression on the sealing material 62. In alternative embodiments, the seals on the different components may be reversed, bayonet protrusions and bayonet slots may be reversed and/or the like. In other embodiments, threads may be used in place of bayonet fittings.

The hardened converter 20 can be mounted within the outer port 216 of the fiber optic adapter 214 to make the port 216 compatible with the fiber optic connector 422. To mount the hardened converter 20 within the outer port 216, the first end 28 of the hardened converter 20 is inserted into the port 216 and is manipulated, such that the paddles 30 of the connector holder 24 fit within the corresponding receivers/receptacles provided within the outer port 216. Once the connector holder 24 is properly positioned/seated within the port 216, the anchoring piece 22 is threaded into the internal threads 272 of the outer port 216 to secure the hardened converter 20 in place within the outer port 216. When mounted within the outer port 216, the flange 42 of the hardened converter 20 can be flush with the outer portion of the adapter 214. In other embodiments, the flange 42 may be recessed within the outer port 216 or may project slightly outwardly from the port 216. Notches (not shown) can be provided in flange 42. The notches can be sized to interlock with a tool, such as a spanner wrench used to turn the anchoring piece 22 within the threads 272.

Once the hardened converter 20 is mounted within the outer port 216, the port 216 can accommodate the fiber optic connector 422. For example, the fiber optic connector 422 can be axially inserted into the port 216 through the second end 40 of the hardened converter 20. When the connector 422 is inserted into the second end 40, the connector 422 passes through the central passages 44, 32 of the hardened converter 20. Insertion continues until latches (not illustrated) on the hardened converter 20 interlock with the retention shoulders 432 of the connector 422. Once the latches interlock with the shoulders 432, the connector 422 is retained at a location with the ferrule 430 positioned at an appropriate depth within the outer end 254 of the split sleeve 250. The connector 422 can be removed from the hardened converter 20 by pulling back on the release sleeve 434. To facilitate grasping the release sleeve 434, an extender can be mounted to the back side of the release sleeve 434.

Once the hardened converter 20 is mounted within the outer port 216, and the fiber optic connector 422 is connected to the port 216, the sealing shell 50 may be mounted over the second end 40 of the hardened converter 20. The first end 53 of the shell body 52 may fit over the second end of the hardened converter 20, and second sealing ring 48 may form a seal with the inner surface shell body 52. The seal may be an axial seal or a radial seal, and the seal may be on the hardened converter 20 or on the sealing shell 50. The shell body 52 may be attached to the hardened converter 20 via the bayonet protrusion 56 fitting within the bayonet recess 45. In alternative embodiments, the shell body 52 may attach to the hardened converter 20 via any other suitable attachment mechanism, such as a snap-fit connection, complementary threads, press fit, or the like. When the hardened converter 20 and the sealing shell 50 are connected to one another, the nut 58 of the sealing shell 50 may be tightened, thus sealing the sealing shell 50 to the fiber optic cable. When the hardened converter 20, the sealing shell 50 and the fiber optic connector 422 are all connected together, and when the hardened converter 20 is mounted within the outer port 216, the fiber optic connector 422 and the fiber optic cable 450 are located within a sealed environment.

Figure 7:
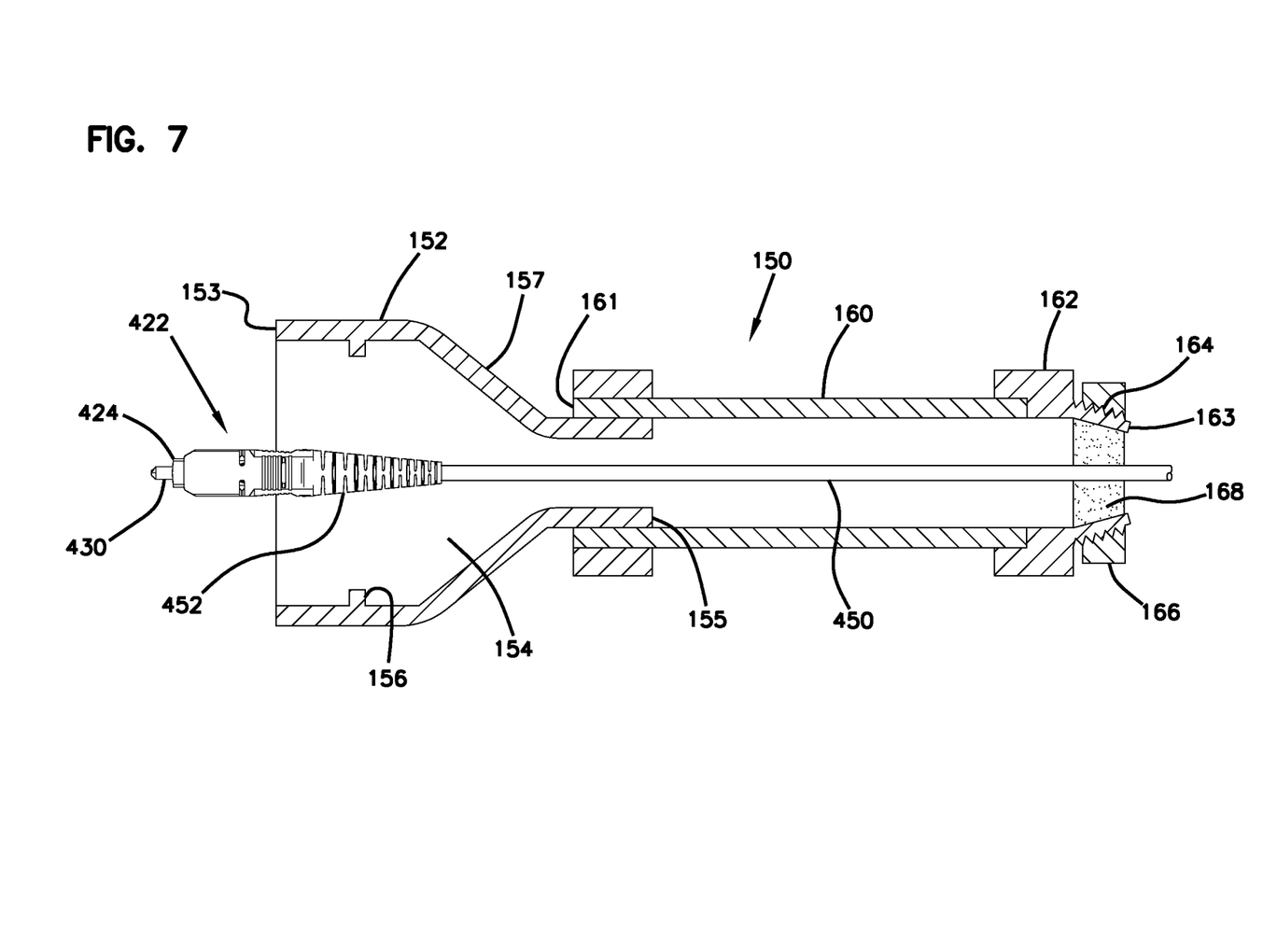
FIG. 7 is a side view of an alternative embodiment of a sealing shell, with a side view of a standard non-ruggedized SC fiber optic connector.

FIG. 7 shows an alternative embodiment of a sealing shell 150, which may include a shell body 152, which forms an inner passage 154 and includes a bayonet protrusion 156 on its inner surface. The shell body 152 has a first end 153 with a diameter sized to fit over the second end 40 of the hardened adapter, a second end 155 with a narrower diameter, and a tapered portion 157 between the two ends 153, 155. Near the second end 155, the outer surface of the shell body 152 is attached to a first end 161 of a tubular shaft 160. The tubular shaft 160 has a second end 163, opposite the first end 161. The outer surface of the tubular shaft 160, near the second end 163, may include threads 164, for mating with complementary threads on a nut 166. The nut 166 may be tightened onto the threaded portion of the shaft 160 to press a sealing material 168 onto the fiber optic cable 450. In some embodiments, an end portion 162 of the shaft 160 may be a separate piece, while in other embodiments the tubular shaft 160 may be a single, monolithic structure. This embodiment of the sealing shell 150 operates in the same way that the previously described embodiment of the sealing shell 50 operates. In this embodiment, however, the sealing shell 150 forms a seal with the fiber optic cable 450 at a location more distant from the fiber optic connector 422, due to the presence of the tubular shaft 160.

Figure 8:
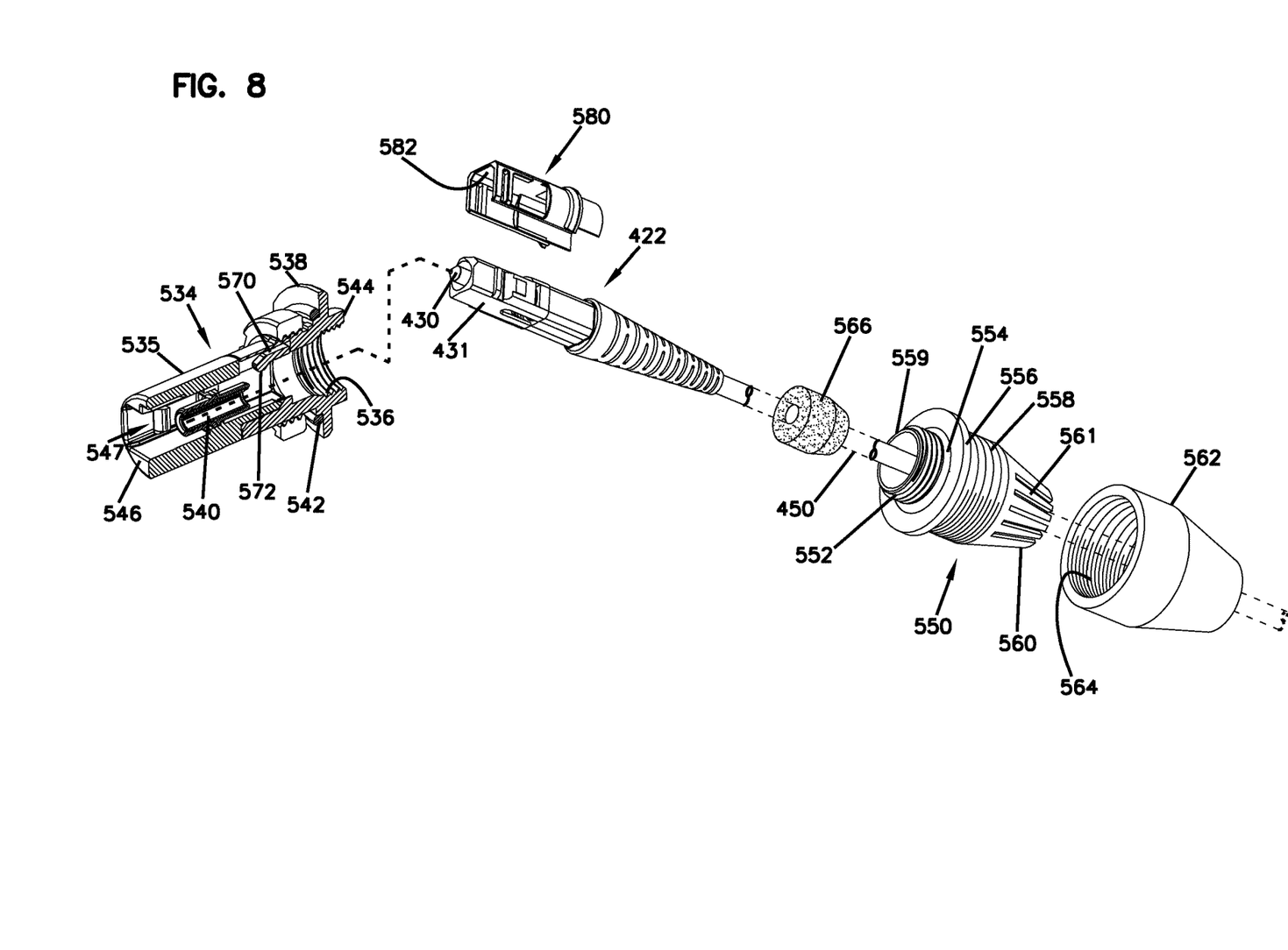
FIG. 8 is a perspective view of a hardened converter and sealing shell, with a standard non-ruggedized SC fiber optic connector, according to an alternative embodiment.

With reference now to FIG. 8, another alternative embodiment of a hardened converter 534 and a sealing shell 550 are illustrated, along with the SC connector 422. In some embodiments, a converting sleeve 580 may be snapped over the connector body 431 of the connector 422, which is compatible and connectable with the hardened converter 534. An inner portion 582 of the converting sleeve 580 is configured to match the connector body 431.

In the illustrated embodiment, the hardened converter 534 includes a body, with a first end 544, a second end 546 and a channel 547 through the converter 534 between the two ends 544, 546. There are internal threads 536 near the first end 544, and there is also a flange 538 and a sealing ring 542 on an external surface near the first end 544. The inside of the converter 534 may include an arm 570 with a retention tab 572 at its free end and a split sleeve 540 for receiving the ferrule of the connector 422. A component that is similar to the hardened converter is described in further detail in U.S. Pat. No. 9,482,829, which is hereby incorporated by reference in its entirety.

The sealing shell 550 may include a shell body 558, having a first end 559, a second end 560, multiple tapered fingers 561 at the second end 560, and first threads 552 near the first end 559. The sealing shell 550 may also include a first seal 554, a flange 556, a second seal (not visible) on the other side of the flange 556, and second threads 558. An outer sealing component 562 may have internal threads 564 configured to mate with the second threads 558. A sealing material 566 fits into the fingers 561 near the second end 560 of the sealing shell 550. When the sealing component 562 is threaded onto the second end of the sealing shell 550, the fingers 561 compress down over the sealing material 566 to press the sealing material 566 around the fiber optic cable 450, thus forming a seal. The first end 559 of the sealing shell 550 may be threaded into the first end of the hardened converter 534, via threads 536 and 552, such that the first seal 554 forms a seal with the first end 544 of the hardened converter 534.

In general, the hardened converter 534 and the sealing shell 550 may be used in a manner similar to those described above, and various embodiments may include any of the features or alterations described above, such as different mechanisms for fastening the hardened converter 534 and the sealing shell 550, different sealing mechanisms and/or the like.

From the forgoing detailed description, it will be evident that modifications and variations can be made in the devices of the disclosure, without departing from the spirit or scope of the invention.

I claim:

1. A device for attaching a non-ruggedized fiber optic connector to a ruggedized fiber optic adapter port, the device comprising:
   a converter comprising:
      a first end including a first mechanical interface compatible with the ruggedized fiber optic adapter port, the first mechanical interface comprising:
         a sealing ring that provides sealing with the ruggedized fiber optic adapter port when the first end of the converter is positioned within the ruggedized fiber optic adapter port; and
         a first fastening interface that interlocks with the ruggedized fiber optic adapter port to secure the converter within the ruggedized fiber optic adapter port;
      a second end including a second mechanical interface, which includes a second fastening interface; and
      a channel that extends through the converter between the first and second ends for receiving the non-ruggedized fiber optic connector;
   a sealing shell comprising:
      a first end including a third mechanical interface compatible with the second mechanical interface of the converter, the third mechanical interface including a third fastening interface that interlocks with the second fastening interface to secure the first end of the sealing shell to the second end of the converter; and
      a tapered second end supporting a cable seal for forming a seal with a cable extending from the non-ruggedized fiber optic connector;
   a sealing element that provides sealing between the first end of the sealing shell and the second end of the converter; and
   an outer sealing component having an inner tapered portion configured to engage the tapered second end of the sealing shell and compress the tapered second end on the cable seal to form the seal with the cable.

2. The device of claim 1, wherein the sealing element is mounted at the second end of the converter.

3. The device of claim 1, wherein the sealing element is an axial face seal or a radial seal.

4. The device of claim 1, wherein the sealing element is an elastomeric ring.

5. The device of claim 1, wherein the cable seal is an elastomeric sealing grommet.

6. The device of claim 1, wherein the first fastening interface includes a rotational interlock.

7. The device of claim 6, wherein the rotational interlock includes threads or a bayonet interface.

8. The device of claim 1, wherein the second and third fastening interfaces includes rotational interlocks.

9. The device of claim 8, wherein the rotational interlocks include threads or bayonet interfaces.

10. The device of claim 1, wherein the outer sealing component comprises a nut.

* * * * *